United States Patent [19]

Schleicher

[11] 4,109,563
[45] Aug. 29, 1978

[54] LOW NOISE FLUID DISTRIBUTOR

[75] Inventor: George W. Schleicher, Addison, Ill.

[73] Assignee: Vapor Corporation, Chicago, Ill.

[21] Appl. No.: 730,236

[22] Filed: Oct. 6, 1976

[51] Int. Cl.² .......................................... F24F 13/04
[52] U.S. Cl. ................................. 98/40 C; 98/38 E;
98/36; 98/40 N; 251/145
[58] Field of Search .................. 98/38 E, 40 N, 38 F,
98/40 C, 36; 62/427; 417/161; 251/DIG. 2;
425/83; 251/145; 165/123; 138/45 A

[56] References Cited

U.S. PATENT DOCUMENTS

| 3,343,473 | 8/1967 | Gillick et al. | 98/33 R |
| 3,804,157 | 4/1974 | Wenig | 98/40 C |
| 3,981,326 | 9/1976 | Gorchev | 98/38 E |

FOREIGN PATENT DOCUMENTS 852,603  10/1960  United Kingdom ................... 98/38 E

OTHER PUBLICATIONS

IBM Technical Disclosure Bulletin, vol. 13, No. 12, [5, 1971] pp. 3693–3694.

*Primary Examiner*—Henry C. Yuen
*Attorney, Agent, or Firm*—Francis J. Lidd

[57] ABSTRACT

A fluid distributor for mixing primary and secondary fluids and distributing this mixture to the surrounding environment at a low noise level includes a housing defining first, second, and third chambers. The first chamber is coupled to a source of primary fluid and includes several fluid outlet nozzles that communicate with the second chamber. The second chamber also includes several fluid outlet nozzles in fluid communication with the third chamber. The third chamber, in addition to being in fluid communication with primary fluid across a nozzle, is also adapted to be in fluid communication with a source of secondary fluid. The primary fluid mixes with the secondary fluid and flows out an outlet in the third chamber into the surrounding environment.

10 Claims, 3 Drawing Figures

LOW NOISE FLUID DISTRIBUTOR

BACKGROUND OF THE INVENTION

A. Field of the Invention

The present invention relates to distributors for mixing secondary and primary air, and distributing the mixture to the atmosphere at a low noise level.

B. Description of the Prior Art

Modern transit vehicles such as buses and trains require extensive air-conditioning and heating to insure proper comfort levels in these vehicles during the transportation of passengers. Typically, the air-conditioning and heating units are mounted below the transit vehicle. Primary air is circulated through these units and communicated to the interior of the transit vehicle through a system of ducts. This primary fluid is distributed to the interior of the vehicle by fluid distributors typically mounted along the inside and at the bottom of the walls of the transit vehicle. The distributors mix the primary fluid from the heating or cooling unit with secondary fluid within the vehicle and then distribute this mixed fluid to the environment within the transit vehicle resulting in a comfortable temperature level. An example of a prior art unit as described is disclosed in U.S. Pat. No. 3,343,473. Other examples may be found in U.S. Pat. Nos. 3,012,759, 3,194,307, and 3,217,788.

One of the major difficulties encountered in prior art distributors is that as a result of the large volume of mixed primary and secondary fluid that is introduced to maintain the temperature within the vehicle at a comfortable level, as the fluid passes through the distributor, a high frequency noise is created.

Accordingly, it is desirable to provide an air distributor that can efficiently mix secondary and primary air and distribute the mixture to the interior of the vehicle in a large enough volume to maintain the desired temperature level within the vehicle while operating at a minimum noise level. Prior art methods of reducing the noise include the employment of quieting chambers and acoustics. These methods do not significantly reduce noise levels without substantial expense.

SUMMARY OF THE INVENTION

An object of the present invention is to provide a new and improved fluid distributor system.

Another object of the present invention is to provide a new and improved fluid distributor that distributes fluid in large volumes at a low noise level.

Briefly, the present invention is a new and improved air distributor that may be employed in transit vehicles to mix primary and secondary air and distribute this mixed air throughout the interior of the transit vehicle at a low noise level.

The distributor includes a housing defining first, second, and third chambers. The first chamber is adapted to communicate with a source of primary air such as an air-conditioning unit. The first chamber also includes a convergent-divergent outlet that is defined by an adjustable damper. The outlet in the first chamber is in fluid communication with the second or expansion chamber. The second chamber includes a smooth or round edge outlet nozzle that is in fluid communication with the third chamber. The third chamber is also in fluid communication with a source of secondary air such as the interior of the transit vehicle. The passage of the primary fluid through the round edge nozzle is directed to a fluid outlet in the third chamber. As the primary air flows through the third chamber, the secondary air is entrained by the primary fluid resulting in a mixed flow of primary and secondary air. This mixture is then directed into the environment within the transit vehicle providing a comfortable temperature level.

BRIEF DESCRIPTION OF THE DRAWINGS

The present invention together with the above and other objects and advantages will best appear from the following detailed description of an illustrative embodiment of the invention shown in the accompanying drawings, wherein.

DETAILED DESCRIPTION OF THE PREFERRED EMBODIMENT

Figure 1:
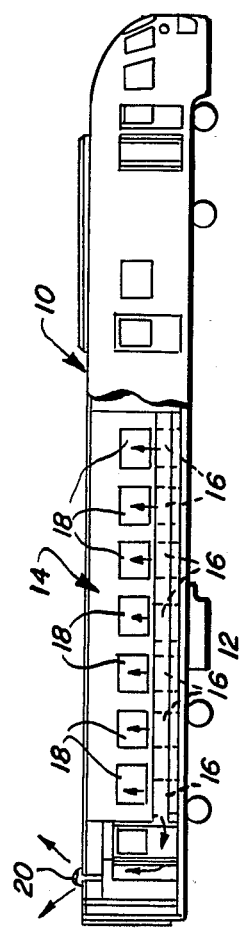
FIG. 1 is a fragmentary, elevational view of a transit vehicle including a low noise air distributor constructed in accordance with the principles of the present invention.

Having reference now to the drawings, and initially to FIG. 1, there is illustrated a transit vehicle 10 including a source of primary air generally designated as 12. The source of primary air 12 may be an air conditioning unit, a heating unit, or a combination thereof, and is intended to cool or heat the interior 14 of the vehicle 10. The primary air is conducted from the source 12 by a flexible conduit 13 to the inlet of one or more distributors 16 that are typically located beneath the windows 18 of the vehicle 10. The distributors 16 mix secondary air or air in the interior 14 of the vehicle 10 with the primary air and circulates the mixed primary and secondary air in the interior 14 to maintain a comfortable temperature level. The vehicle 10 includes a vent 20 that communicates the interior 14 with the environment surrounding the vehicle 10 in order to vent the interior 14 and provide secondary air as necessary.

Figure 2:
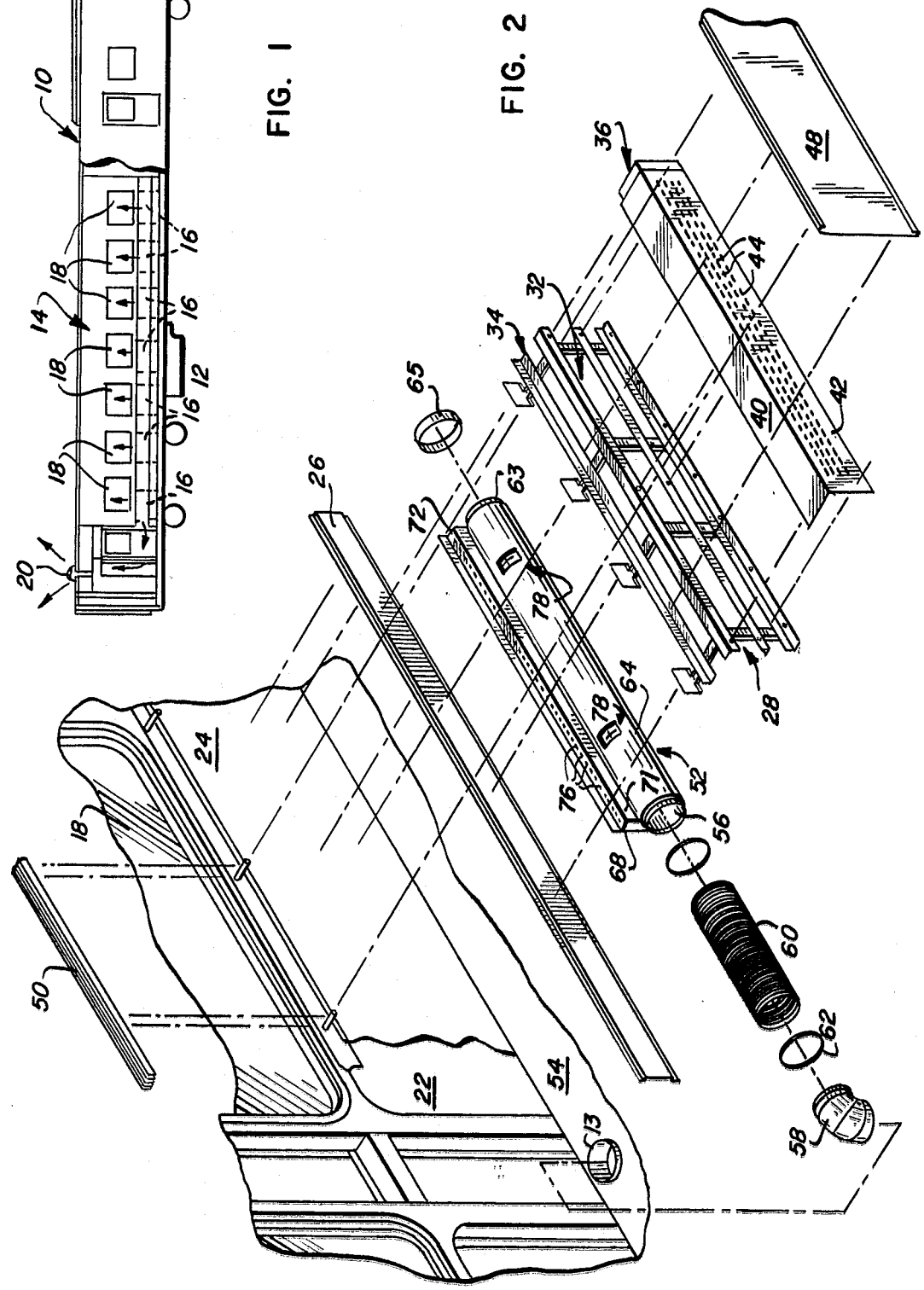
FIG. 2 is an exploded view of the distributor of the present invention.
Figure 3:
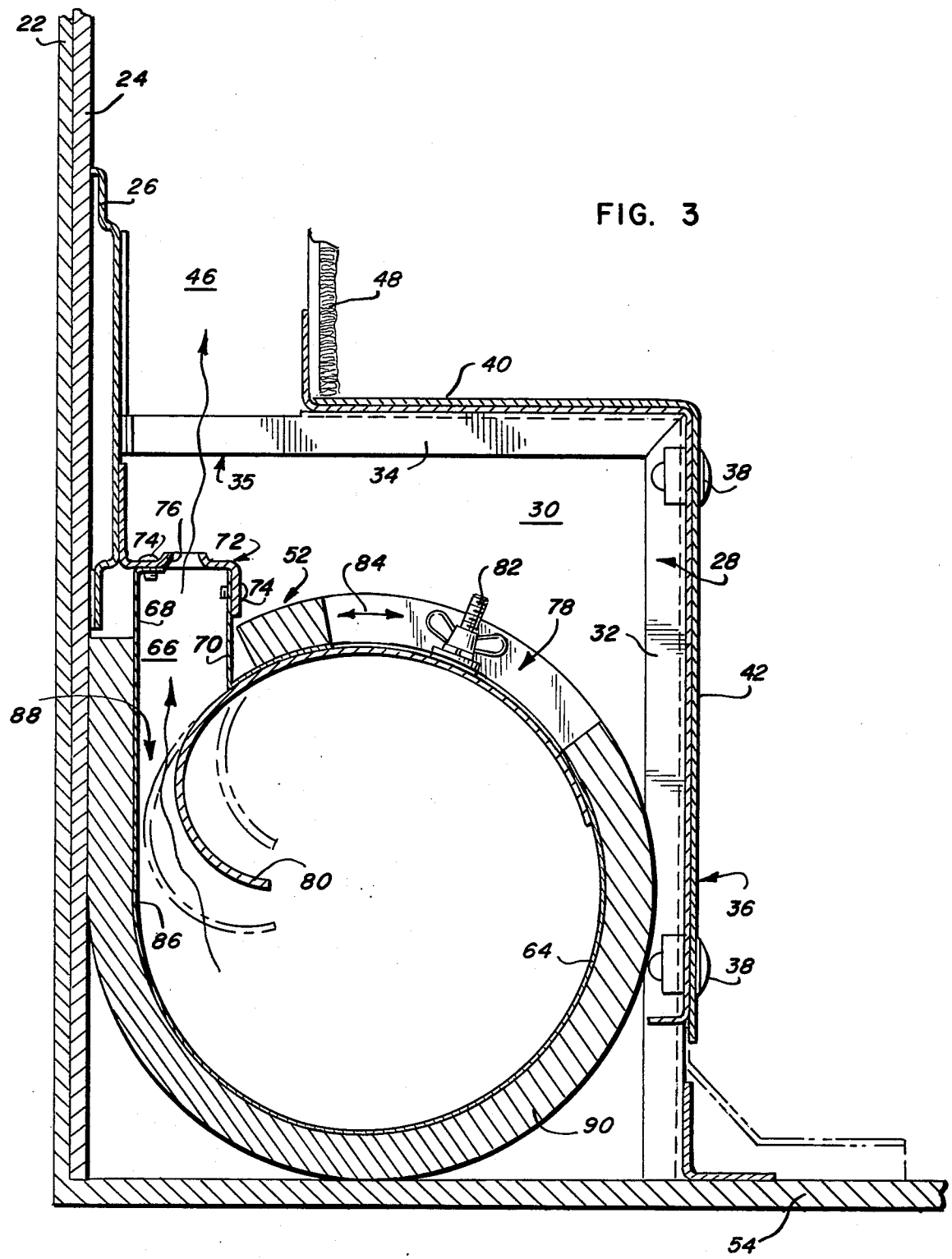
FIG. 3 is a cross-sectional view of the distributor of the present invention.

The distributor 16 is preferably mounted on the wall 22 of the vehicle 10 and below a window 18 so as to cool or warm the air nearest the outside environment without impinging upon a passenger seated adjacent to a window 18. To allow the securement of the distributor 16 adjacent and below a window 18, a mounting or back plate 24 is secured to the wall 22 of the vehicle 10. The distributor 16 is then secured to the plate 24. More specifically, a base plate 26 is secured to the plate 24 (FIG. 2). A skeletal frame 28 is attached to the base plate 26 and serves as the frame or housing of the distributor 16. The frame 28 is of a right angle configuration and once attached to the plate 26, defines a space or chamber 30 (FIG. 3).

The front 32 and a portion of the top 34 of the frame are enclosed by the securement of a cover 36 to the frame 28 by fasteners 38. The cover 36 is also of an angular configuration and includes a top 40 and a front 42. The chamber 30 is in fluid communication with secondary air in the interior 14 of the vehicle 10 through a plurality of slots 44 fabricated in the front 42 of the cover 36.

The portion 35 of the top 34 of the frame 28 not enclosed by the cover 36 defines an air outlet 46 for the chamber 30. It is through this outlet 46 that mixed primary and secondary air flows into the interior 14 of the vehicle 10. It has been determined by experiment that to obtain the optimum mixture of primary and secondary air, the total width of the slots 44 should be four times as large as the width of the outlet 46.

In order to provide a decorative appearance, a wainscot 48 may be secured to the frame 28 in front of the outlet 46, and an output grille 50 may be mounted within the outlet 46 and on top of the frame 28.

In accordance with an important feature of the present invention, mounted within and extending the length of the frame 28 is a distribution duct generally designated by the numeral 52. The distribution duct 52 is in fluid communication with the source of primary air 12 and distributes primary air into the chamber 30. The duct 52 is coupled to the source of primary air 12 through the floor 54. A first or inlet end 56 of the duct 52 is coupled to the conduit 13 by an elbow 58 and a flexible hose 60. The hose 60 is coupled to the elbow 58 by a clamp 62. A second end 63 of the duct 52 may be closed by a cap 65.

The duct 52, in the embodiment illustrated, is of a cylindrical configuration defined by a housing 64. The housing 64 includes an expansion chamber 66 of a fixed dimension as defined by portion 68 and 70 of the housing 64. The housing 64 is secured to a round edge nozzle assembly 72 by several fasteners 74. The nozzle assembly 72 is in turn secured to the base plate 26. The nozzle assembly 72 includes a round edge nozzle 76 that defines an outlet for the chamber 66. As best seen in FIG. 2, the nozzles 76 are spaced along the entire length of the duct 52.

Typical prior art distributors include a single nozzle outlet similar to the nozzle 76; however, the prior art nozzle is of the sharp edge type. As air flows through this prior art nozzle an annoying high frequency noise is created as a result of the sharp edge and of the turbulence and pressure pulsations in the primary air. To reduce the high frequency noise, the round edge nozzle 76 is included. In addition, to further reduce the noise level by reducing the turbulence and pressure pulsations in the primary air, an adjustable damper assembly, generally designated as 78, is included.

The damper assembly 78 includes an arcuate damper 80 that is secured to the duct housing 64 by a wing nut 82 and a slot arrangement that allows the damper 80 to be moved in the directions of the arrow 84 thereby varying the position of the damper 80 relative to the portion 86 of the housing 64. The damper 80 in combination with the portion 86 define a convergent-divergent nozzle outlet 88 for the primary fluid in the duct 52. The damper 80 may be adjusted at several points along the length of the duct 52 (FIG. 2) such that the transverse dimension of the throat of nozzle outlet 88 may be increased at points distant from the first or inlet end 56 of the duct 52.

To reduce the heat losses from duct 52 which reduces the effectiveness of the primary fluid, the duct housing 64 is covered by the insulation 90.

In operation, primary air from the source 12 is introduced into the duct 52 at the first end 56. In the duct 52, the primary air has a high static pressure and high velocity. Typically, the primary air is turbulent and includes pressure pulses. The primary air flows out of the duct through the convergent-divergent nozzle 88. As the primary air passes through the outlet nozzle 88, its velocity is increased, and upon entering the expansion chamber 66, the velocity of the primary air is lowered as is its pressure. This passage through the outlet nozzle 88 causes a decay in the turbulence and the pressure pulses in the primary air thereby reducing the high frequency noise resulting from the flow of the primary air through the distributor 16.

The primary air in the expansion chamber 66 proceeds to flow through the round edge nozzle outlet 76 further reducing the velocity and pressure levels and the turbulence and pressure pulsations and, thus, the high frequency noise level of the primary air as it enters the chamber 30. As the primary air flows through chamber 30 to the outlet 46, secondary air entering chamber 30 through slots 44 in the cover 36 is entrained and mixed with the primary air. The total area of the slots 44 and the nozzles 76 as well as the velocity of the primary fluid are predetermined such that the resultant mixed air leaving the distributor through the outlet 46 is approximately seventy percent (70%) secondary air.

The entrainment of secondary air in the chamber 30 creates a circulation of air from the interior 14 of the vehicle 10 through the slots 44 into the chamber 30. Moreover, the mixture of primary and secondary air provides an even, comfortable temperature level in the vehicle 10.

While the invention has been described with reference to details of the illustrated embodiment, it should be understood that such details are not intended to limit the scope of the invention as defined in the following claims.

What is claimed and desired to be secured by Letters Patent of the United States is:

1. A low noise fluid distributor comprising a housing, said housing defining first, second, and third chambers,
    said first chamber having an inlet adapted to be coupled to a source of primary fluid,
    at least one fluid outlet nozzle defined in said first chamber, said nozzle defining a fluid inlet in said second chamber,
    said second chamber including at least one nozzle defining a fluid outlet for said second chamber, said outlet nozzle for said second chamber in fluid communication with said third chamber,
    said first chamber adapted to be in fluid communication with a source of secondary fluid, and
    a fluid outlet in said third chamber adapted to allow the passage of mixed secondary and primary fluids,
    said first chamber including a damper defining said outlet nozzle in said first chamber, said damper being adjustable to define the transverse dimension of said nozzle,
    said damper having an arcuate configuration defining a converging-diverging nozzle.

2. The distributor set forth in claim 1, said outlet nozzle in said second chamber having a rounded edge.

3. The distributor set forth in claim 2, said third chamber including at least one aperture providing fluid communication with the environment surrounding said distributor.

4. A low noise air distribution system for mixing and distributing primary and secondary air comprising
    a housing,
    an air duct mounted in said housing, said duct including an inlet adapted to be coupled to a source of primary air,
    a damper secured to said duct, said damper being curvilinear and defining a first converging-diverging nozzle outlet for said duct,
    a first expansion chamber mounted in said housing, said first chamber including an inlet in fluid communication with said duct outlet, said first chamber having an outlet defined by a second nozzle, a second expansion chamber mounted in said housing including a first inlet defined by said second nozzle, said second chamber having a second inlet adapted to be in fluid communication with a source of secondary fluid, said second chamber further including an outlet adapted to be in fluid communication with the environment surrounding said system.

5. The system claimed in claim 4, said second nozzle being a round edge nozzle.

6. The system claimed in claim 5, said damper being movable to vary the transverse dimension of said duct outlet.

7. The system claimed in claim 5, the ratio of the size of said outlet in the second chamber to the size of the second inlet in the second chamber being 1:4.

8. An air distributor for mixing primary and secondary air and distributing the mixture into the interior of a transit vehicle at a low noise level comprising a housing;

said housing defining a first chamber including an inlet communicating said first chamber with said secondary air in the interior of said vehicle; said housing further including an outlet in fluid communication with said first chamber and said interior of said transit vehicle;

a duct mounted within said first chamber; said duct including an inlet adapted to be in fluid communication with a source of said primary air; said duct further including an adjustable, arcuate damper; said damper defining in combination with said duct a convergent-divergent outlet nozzle; and an expansion chamber mounted in said first chamber, said expansion chamber including an inlet in fluid communication with said convergent-divergent outlet nozzle, said expansion chamber also including a round edge nozzle defining an outlet, said round edge nozzle in fluid communication with said first chamber;

wherein said primary air mixes with said secondary air as said primary air flows through said first chamber whereupon the mixed air flows through said housing outlet.

9. The distributor claimed in claim 8, said damper being adjustable to vary the transverse dimension of said convergent-divergent nozzle.

10. The distributor set forth in claim 8, the ratio of the transverse dimensions of said outlet and said inlet of said housing being 1:4.

* * * * *